May 23, 1939.  K. B. SAGE  2,159,230
FISH LURE
Filed Aug. 4, 1938
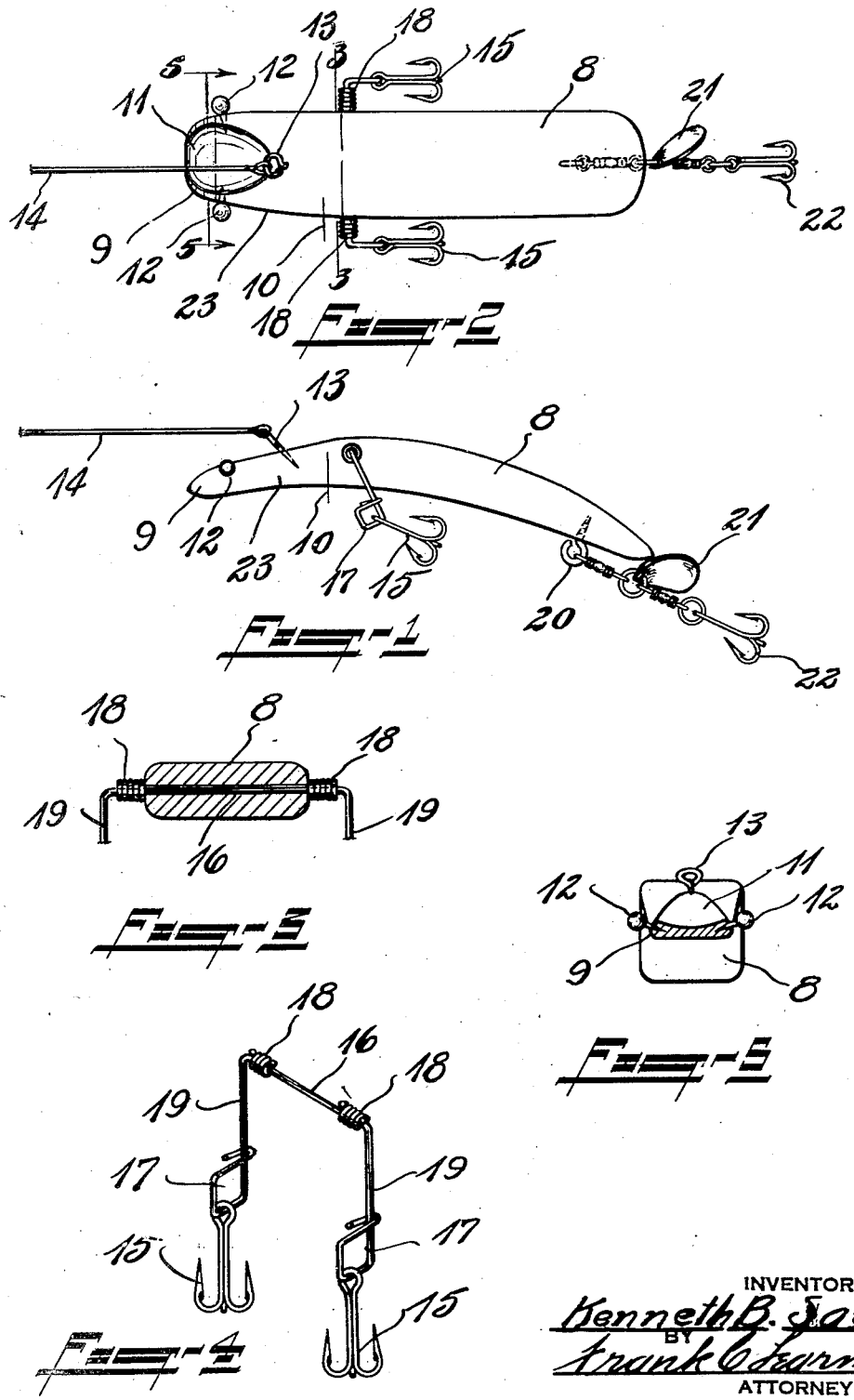

UNITED STATES PATENT OFFICE 2,159,230

FISH LURE

Kenneth B. Sage, Central Lake, Mich.

Application August 4, 1938, Serial No. 222,983

4 Claims. (Cl. 43—46)

This invention relates to fish lures, and more particularly to a lure for casting or trolling.

One of the prime objects of the invention is to design a simple and inexpensive lure, the body of which is upwardly arched, with the edges shaped as to cause it to wobble as it is drawn through the water, thus simulating the movements of live baits.

Another object is to provide a lure including a spinner which serves as a ballast, and which will (due to the action of the lure) swing in a broad arc, thus providing a high degree of hooking efficiency.

A further object is the provision of a lure of this nature wherein the body thereof carries the hooks, these being mounted or arranged in a novel manner to permit the hooks to rotate or swing parallel with the body, and avoid catching the body of the lure, this arrangement being highly efficient for hooking game fish when the same strike the lure, said hooks being adaptable for easy penetration, and by reason of the disposition of such hooks, offset from the body, the fish find it more difficult to obtain a purchase on the body of the lure by which they could more easily eject the hooks.

A still further object is to design a lure of this character which is well balanced, and simple in construction, reliable and efficient for the purpose intended, and which is inexpensive to manufacture.

With the above and other objects in view, the present invention consists in the combination and arrangement of parts, hereinafter more fully described, illustrated in the accompanying drawing, and more particularly pointed out in the appended claims, it being understood that changes may be made in the form, size, proportion and minor details of construction, without departing from the spirit, or sacrificing any of the advantages of the invention.

In the drawing:

Fig. 1 is a side elevational view of a lure constructed in accordance with the invention.

Fig. 2 is a top plan view thereof.

Fig. 3 is a fragmentary transverse sectional view taken on the line 3—3 of Fig. 2.

Fig. 4 is an enlarged perspective view showing the rod and hook arrangement.

Fig. 5 is a transverse sectional view taken on the line 5—5 of Fig. 2.

Referring now more particularly to the drawing in which I have shown the preferred embodiment of my invention, the numeral 8 indicates the arched body of the lure which can be formed of any desired, suitable material, the nose 9 of which has a decided taper horizontally, beginning from the shoulder 10 making it more or less shovel shaped, the upper surface of the nose being concaved as shown at 11, and ball pins 12 are mounted in the sides of the nose section to represent eyes.

A screw eye 13 is located directly in the rear of the concaved portion of the nose, and a conventional line 14 is secured thereto, so that the pull will be straight from the highest part of the back or body of the lure.

Hookgangs 15 are mounted on the body 8 as clearly shown in Figs. 1, 3, and 4 of the drawing, a small horizontally disposed rod 16 passing completely through the body of the lure, the ends being bent at right angles to the main body, the extreme ends being shaped to form loops 17 to which the hookgangs 15 are attached as clearly shown in Fig. 4 of the drawing, coiled wire spacers 18 being interposed between the side of the body and the bent legs 19, and serve to provide proper clearance for the hooks so that they will not snag on the body. This arrangement permits the hooks to freely swing or rotate parallel with the body of the lure.

A screw eye 20 is attached to the rear end of the lure body as shown, and a spinner 21 is secured thereto, said spinner having a hook 22 associated therewith, which hook is of the same character and construction as the hooks 15, the spinner sets up a light reflection and a commotion in the water which attracts the game fish. It also serves as a ballast for the body due to the wobbling action of the lure, it swings about an arc of approximately 170 degrees, thus providing a high degree of hooking efficiency.

I wish to direct particular attention to the fact that the body has a decided taper from the shoulder 10 to the forward end of the lure, this taper being most pronounced on the right hand side as at 23, looking from the front of the lure, and this taper causes the lure to wobble and simulate the movement of a live bait.

The lure is simple, attractive, and easy to manufacture, it is well balanced, and is highly efficient in hooking the fish which strike, and while in the present instance I have shown sets of hookgangs, it will be readily understod that these may be single or double should it be found desirable.

From the foregoing description, it will be obvious that I have perfected a simple, practical and economical lure for fishermen.

What I claim is:

1. An artificial lure of the character described, comprising an upwardly arched body, a U-shaped rod revolvably mounted in said body and provided with hooks hingedly connected to the lower ends thereof, spacers mounted on said rod and interposed between the body and the depending legs of the rod, and a spinner and hook assembly secured to the underside and at the rear of said body.

2. A fishing device of the character described and comprising an upwardly arched body, the forward end being horizontally tapered to form a nose, a concave shaped depression on and parallel to the upper curvature of said nose, a U-shaped rod revolvably mounted in the body and provided with hooks on the ends thereof, a spinner assembly secured to the underside of the rear end of the body and including a hook, said body being formed with a pronounced taper on one side of the body at the forward end thereof, to produce a wobbling action of the bait as it is drawn through the water.

3. A fishing device of the character described and comprising a body member, the forward end being horizontally tapered to form a nose, a concave depression formed in the upper surface of the nose portion, a U-shaped rod revolvably mounted in the body adjacent the front end thereof and having hooks on the ends of said rod, spacers on said rod for definitely spacing the hooks with relation to the sides of said body, a spinner and hook assembly secured to the underside of the body at a point adjacent the rear end thereof, and a line attached to the upper surface of the body at a point just above the concave depression in the nose.

4. A fishing device of the character described and comprising an upwardly arched body formed with a horizontally tapered nose section having a concave shaped depression in the upper surface thereof, ball pins mounted on the sides of said nose section, a U-shaped rod revolvably mounted in said body at a point intermediate its length and provided with hookgangs on the lower ends thereof, spacers mounted on said rod and interposed between the body and the depending legs of the rod, a spinner and hookgang assembly secured to the underside of the body at a point adjacent the rear end thereof, one side of the forward end of said body having a pronounced taper to cause the body to wobble when drawn through the water, and a screw-eye in said body at a point directly above the depression in the nose and to which a line is secured.

KENNETH B. SAGE.